June 11, 1940.  W. MAHNKEN  2,203,736

TUNING CONTROL FOR RADIO RECEIVERS

Filed Oct. 8, 1937

INVENTOR
WERNER MAHNKEN
BY
ATTORNEY

Patented June 11, 1940

2,203,736

UNITED STATES PATENT OFFICE 2,203,736

TUNING CONTROL FOR RADIO RECEIVERS

Werner Mahnken, Blankenfelde, Mahlow, Germany, assignor to Telefunken Gesellschaft für Drahtlose Telegraphie m. b. H., Berlin, Germany, a corporation of Germany Application October 8, 1937, Serial No. 167,987
In Germany October 8, 1936

4 Claims. (Cl. 74—10)

The invention relates to a tuning control for radio receivers, said control operating for each position of the single adjustment knob as a vernier adjustment throughout a narrow adjustment range, but otherwise as a rough adjustment.

The invention relates to an improvement in such adjustment arrangements and resides in that the single adjustment knob actuates the device to be adjusted, such as the variable condenser, on the one hand, across a reduction drive and friction coupling, and communicates with said device on the other hand, across a coupling (either directly or with intermediate drive) said coupling being effective only outside a limited rotary angle by the use of abutment members.

The advantage of this control arrangement resides in that the range of the vernier adjustment as well as the reduction ratio can be rendered practically as large as desired, since at a given reduction drive, the range of the vernier adjustment can be extended over wide limits, if in a manner known as such, the rotary angle within which the shafts are displaceable relative each other, is chosen sufficiently wide. The reduction ratio can be maintained constant throughout the entire vernier adjustment range.

Figure 1:
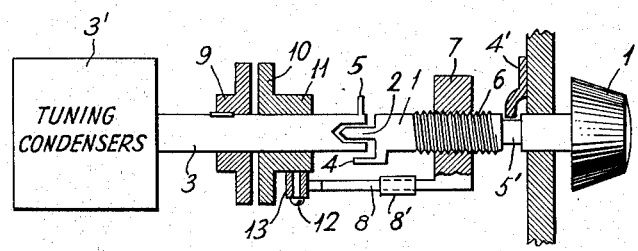
Figure 2:
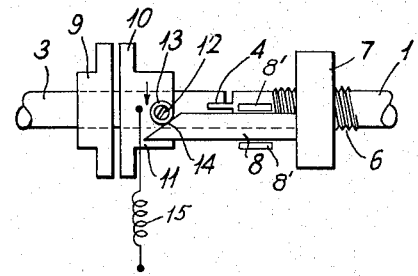
Figure 3:
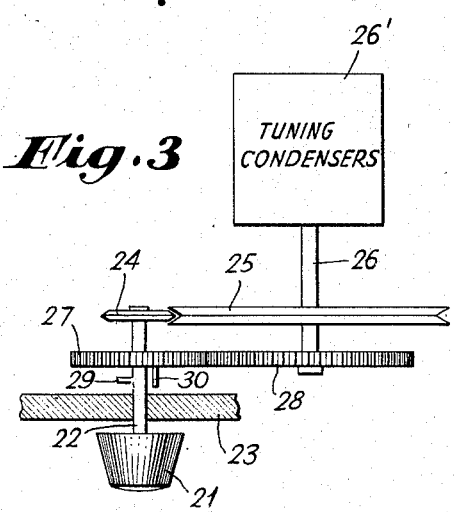

Examples of constructions according to the invention are shown in the accompanying drawing in connection with a variable condenser drive for a receiver, wherein Figure 1 shows one modification, in a horizontal cross section laid through the shaft; Figure 2 represents a side elevational view of Figure 1; and Figure 3 shows a second modification according to the invention.

Referring to Figures 1 and 2, the drive shaft 1 provided for instance with an adjustment knob 1' is turnably mounted with the journal 2 in a suitable bore of the shaft 3 which is connected with the variable condenser 3' shown in block, either directly or across a drive. The drive shaft 1 is restrained from moving in an axial direction by suitable means such as the fixed key member 4' engaging the peripheral slot 5' in the shaft. The rotary movement of said drive shaft 1 is conveyed to said shaft 3 only when the pin 4 affixed to the shaft 1 moves the pin 5 affixed to the shaft 3 in the direction of rotation. The play existing between the two shafts is about 360° in the present case. The part 6 of the drive shaft is formed as screw spindle with which the nut-like member 7 is threadedly engaged. The nut is fixedly connected with the plate 8. Plate and nut are guided in such a manner, as by the guide member 8', that they can move only in the direction of the axis. The shaft 3 connected with the variable condenser has the disk 9 fixedly secured thereon, said disk being coupled by way of friction with the freely rotatably mounted disk 10. The tubular extension 11 of the disk 10 has placed thereon a pin 12 and the latter carries a roller 13. This roller so cooperates with the straight edge 14 (Figure 2) of the plate 8 and beveled at about 30°, that when the plate moves straight ahead to the left in the drawing in the direction of the axis, the roller turns on the oblique edge 10 acting as wedge, thereby turning the disk 10 which through engagement with disk 9 actuates the variable condenser. It will of course be understood that the pin 12 is urged in the direction of the arrow by a spring 15 whereby the roller is pressed against the oblique edge. As long as the drive shaft 1 does not move the driven shaft 3 connected with the variable condenser directly through the abutment members 4, 5, the vernier adjustment operates in a manner such that at turning of the drive shaft in counterclockwise direction, the nut 7 together with the plate 8 are pulled towards the left, whereby the disk 10 will likewise be turned counterclockwise but at considerably reduced rotary speed thus carrying therewith the disk 9 and the shaft 3. When however the shaft 1 is rotated in clockwise direction the nut 7 and plate 8 will move to the right as long as abutments 4 and 5 do not coact with one another, and the coupling disc 10 will also be rotated in clockwise direction by the action of the spring 15. The means for obtaining vernier adjustments thus operates in both directions of rotation. At direct coupling of the two shafts the coupling disks glide over each other.

The reduction ratio of the vernier adjustment is determined by the angle of the edge 14 with respect to the axis, then by the diameter of the tubular attachment 11 and by the pitch of the screw 6. The range of the vernier adjustment can be widened by increasing the relative play of the two shafts to two or a greater number of revolutions in the known manner through interposing of one or a greater number of abutment rings.

Obviously the reduction drive for the vernier adjustment may for instance also be designed as gear drive or friction disk drive. The construction herein shown has however the advantage of a negligibly small dead movement, and of a small required space.

Another example of construction is shown in Figure 3 in connection with an adjustment arrangement for the variable condensers of a receiver. The tuning knob 21 is mounted on the shaft 22 which passes through an aperture in the panel of the receiver cabinet. This shaft through the friction disks 24, 25, drives the condenser shaft 26 and condensers 26' at high reduction. At the same time it can drive the condenser shaft at a lower reduction by means of the gear 27 freely mounted on said shaft 22 and with the gear 28 meshing with 27, the gear 28 being fixedly mounted on the shaft 26. This takes place when the shaft 22 moves the gear 27 by means of the pin 29 and abutment member 30. In this case the friction disks 4 and 5 glide above each other.

What I claim is:

1. Mechanism for controlling the tuning of a radio receiver, comprising a driven tuning shaft and a driving control shaft, said shafts being coaxially aligned and relatively movable, means carried by each of said shafts at their adjacent ends which are adapted to co-act during rotation of the control shaft through a predetermined angle to drive the tuning shaft through a coarse adjustment, a friction disc movably mounted with the driven shaft, a second friction disc cooperating with the first disc and loosely mounted on said driven shaft, and means controlled by the driving shaft in either direction of its rotation for causing a fine adjustment of the tuning shaft through engagement of said friction discs.

2. Tuning mechanism according to the invention defined in claim 1 wherein the driving shaft controlled means comprises a member threaded on the driving shaft, rotation of which causes lateral movement only of said member, and a cam device affixed to said member arranged to coact with the second friction disc.

3. Mechanism for controlling the tuning of a radio receiver, comprising a driven tuning shaft and a driving control shaft, said shafts being co-axially aligned and arranged for relative movement, means carried by each of said shafts at their adjacent ends which co-act during rotation of the control shaft through a predetermined angle to drive the tuning shaft through a coarse adjustment, and means operative by rotation of the control shaft to effect a fine adjustment of the tuning shaft, said means comprising a friction disc movably mounted with the driven shaft, a second friction disc cooperating with the first disc and loosely mounted on said driven shaft, and means effective by the rotation of the driving shaft for causing engagement and simultaneous rotation of said friction discs.

4. Mechanism for controlling the tuning of a radio receiver, comprising a driven tuning shaft and a driving control shaft, said shafts being co-axially aligned and arranged for relative movement through a substantial portion of a complete rotation, means carried by each of said shafts at their adjacent ends which co-act during rotation of the control shaft through a predetermined angle to drive the tuning shaft through a coarse adjustment, and means operative by rotation of the control shaft in to effect a fine adjustment of the tuning shaft, said means comprising, a friction disc affixed to and movably mounted with the driven shaft, a second friction disc loosely mounted on said driven shaft and normally disengaged from the first friction disc, said second disc having a hub portion provided with a radially extending projection, an axially movable cam member adapted to cooperate with said projection and controlled by rotation of the driving shaft for causing engagement and simultaneous rotation of said friction discs.

WERNER MAHNKEN.